United States Patent
Roy et al.

(10) Patent No.: US 12,335,783 B2
(45) Date of Patent: Jun. 17, 2025

(54) DYNAMIC FLOW CONTROL FOR LATENCY SENSITIVE WIFI TRAFFIC

(71) Applicant: Hughes Network Systems, LLC, Germantown, MD (US)

(72) Inventors: Satyajit Roy, Gaithersburg, MD (US); Akshay Giridhar Ravichandran, Germantown, MD (US)

(73) Assignee: Hughes Network Systems, LLC, Germantown, MD (US)

(*) Notice: Subject to any disclaimer, the term of this patent is extended or adjusted under 35 U.S.C. 154(b) by 337 days.

(21) Appl. No.: 18/059,642

(22) Filed: Nov. 29, 2022

(65) Prior Publication Data
US 2024/0179569 A1    May 30, 2024

(51) Int. Cl.
*H04W 28/08* (2023.01)
*H04W 28/02* (2009.01)

(52) U.S. Cl.
CPC ... *H04W 28/0967* (2020.05); *H04W 28/0247* (2013.01); *H04W 28/0289* (2013.01)

(58) Field of Classification Search
CPC ......... H04W 28/0967; H04W 28/0247; H04W 28/0289; H04W 28/0236; H04W 84/06; H04W 84/12; H04L 47/11; H04L 47/24; H04L 47/29; H04L 47/2458; H04L 43/08; H04L 41/5025
See application file for complete search history.

(56) References Cited

U.S. PATENT DOCUMENTS

| | | | |
|---|---|---|---|
| 11,736,337 B2* | 8/2023 | Patel | H04W 40/04 709/224 |
| 2021/0029559 A1 | 1/2021 | Agarwal et al. | |
| 2021/0243639 A1* | 8/2021 | Sanaullah | H04B 17/327 |
| 2021/0314238 A1 | 10/2021 | Cioffi et al. | |
| 2023/0112613 A1* | 4/2023 | Mehta | H04L 41/0631 370/216 |

OTHER PUBLICATIONS

International Search Report for PCT Application No. PCT/US2023/079943.

* cited by examiner

*Primary Examiner* — Mohamed A Kamara
(74) *Attorney, Agent, or Firm* — Capitol City TechLaw; Jasbir Singh

(57) ABSTRACT

The techniques described herein relate to a method and device for providing a dynamic flow control for latency sensitive Wi-Fi traffic, the method including: Determining a path is congested, wherein the path is shared by local devices to connect to a remote device, wherein the local devices include one or more wireless devices or one or more wired devices; Calculating, for each of the one or more wireless devices, a weight based on a respective link quality and a respective signal strength; and prioritizing traffic, between the local devices and the remote device via the path, by increasing a priority of traffic associated with the local devices based on a link quality less than a quality threshold or a signal strength less than a signal strength threshold.

19 Claims, 2 Drawing Sheets

DYNAMIC FLOW CONTROL FOR LATENCY SENSITIVE WIFI TRAFFIC

FIELD

A system and method to throttle packets to an acceptable limit from devices connected via a strong link, for example, a wired connection or a wireless connection having a great signal strength. During congestion throttling packets for devices with strong links will not impact user sessions as severely as compared to throttle/dropping packets for devices connected via a weak link. In some embodiments, latency of every connection originating from all connected wireless devices/MAC addresses is monitored and latency-based dynamic re-classification is done if the latency of a connection exceeds a threshold.

BACKGROUND

In an enterprise setting a VSAT can carry traffic from a wired connection or a wireless connection to an external router. Generally, traffic from wireless or Wi-Fi connected devices have a greater latency then wired devices due to channel collision or interference or its signal strength. This latency can be exasperated by satellite links. The present teachings distribute satellite bandwidth fairly across the connected devices while minimizing the impact on traffic flow due to the additional latency incurred by WI-FI traffic when placed along with wired traffic in a VSAT.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The proposed method learns the MAC addresses of the devices connected through wired and wireless links and does a MAC address/device-based flow control. Traffic is dynamically classified based on the device link quality and/or the signal strength/located distance and given a commensurate priority on the available satellite bandwidth. During congestion throttling packets for devices with strong links will not impact user sessions as severely as compared to dropping packets for devices connected via a weak link. In some embodiments, latency of every connection originating from all connected wireless devices/MAC addresses is monitored and latency-based re-classification is done if the latency of a connection exceeds a threshold.

In some aspects, the techniques described herein relate to a method for providing a dynamic flow control for latency sensitive Wi-Fi traffic, the method including: Determining a path is congested, wherein the path is shared by local devices to connect to a remote device, wherein the local devices include one or more wireless devices or one or more wired devices; Calculating, for each of the one or more wireless devices, a weight based on a respective link quality and a respective signal strength; and prioritizing traffic, between the local devices and the remote device via the path, by increasing a priority of traffic associated with the local devices based on a link quality less than a quality threshold or a signal strength less than a signal strength threshold.

In some aspects, the techniques described herein relate to a method, wherein the calculating is based on a respective Received Side Signal Strength (RSSI) and a respective per connection packet loss.

In some aspects, the techniques described herein relate to a method, wherein the calculating, for each of the one or more wired devices, sets the link quality to a maximum and the signal strength to a maximum prior to determining a respective weight.

In some aspects, the techniques described herein relate to a method, wherein the calculator calculates a link quality score using an exponential moving average of the respective link quality for the one or more wireless devices.

In some aspects, the techniques described herein relate to a method, wherein the calculator calculates a signal strength score using an exponential moving average of the respective signal strength for the one or more wireless devices.

In some aspects, the techniques described herein relate to a method, wherein the prioritizing drains traffic for each Class of Service (COS) and priority mapping based on a respective weight of a respective local device.

In some aspects, the techniques described herein relate to a method, further including calculating a total latency experienced prior to sending a packet via the path; and reclassifying the packet when the total latency exceeds a latency threshold.

In some aspects, the techniques described herein relate to a method, wherein the packet belongs to a latency sensitive flow and the reclassifying reclassifies to a higher class of service.

In some aspects, the techniques described herein relate to a method, wherein the packet originates from a wireless device and the reclassifying queues the packet at a higher priority.

In some aspects, the techniques described herein relate to a device to provide a dynamic flow control for latency sensitive Wi-Fi traffic, the device including: a flow control block to determine a path is congested, wherein the path is shared by local devices to connect to a remote device, wherein the local devices include one or more wireless devices or one or more wired devices; a SSS block to calculate, for each of the one or more wireless devices, a weight based on a respective link quality and a respective signal strength; and a WFQ block to prioritize traffic, between the local devices and the remote device via the path, by increasing a priority of traffic associated with the local devices based on a link quality less than a quality threshold or a signal strength less than a signal strength threshold.

In some aspects, the techniques described herein relate to a device, wherein the SSS block calculation is based on a respective Received Side Signal Strength (RSSI) and a respective per connection packet loss.

In some aspects, the techniques described herein relate to a device, wherein the SSS block calculates, for each of the one or more wired devices, sets the link quality to a maximum and the signal strength to a maximum prior to determining a respective weight.

In some aspects, the techniques described herein relate to a device, wherein the SSS block calculates a link quality score using an exponential moving average of the respective link quality for the one or more wireless devices.

In some aspects, the techniques described herein relate to a device, wherein the SSS block calculator calculates a signal strength score using an exponential moving average of the respective signal strength for the one or more wireless devices.

In some aspects, the techniques described herein relate to a device, wherein the WFQ block drains traffic for each Class of Service (COS) and priority mapping based on a respective weight of a respective local device In some aspects, the techniques described herein relate to a device, further including a latency block to calculate a total latency experienced prior to sending a packet via the path; and a COS block to reclassify the packet when the total latency exceeds a latency threshold.

In some aspects, the techniques described herein relate to a device, wherein the packet belongs to a latency sensitive flow and the COS block reclassifies to a higher class of service.

In some aspects, the techniques described herein relate to a device, wherein the packet originates from a wireless device and the COS block queues the packet at a higher priority.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
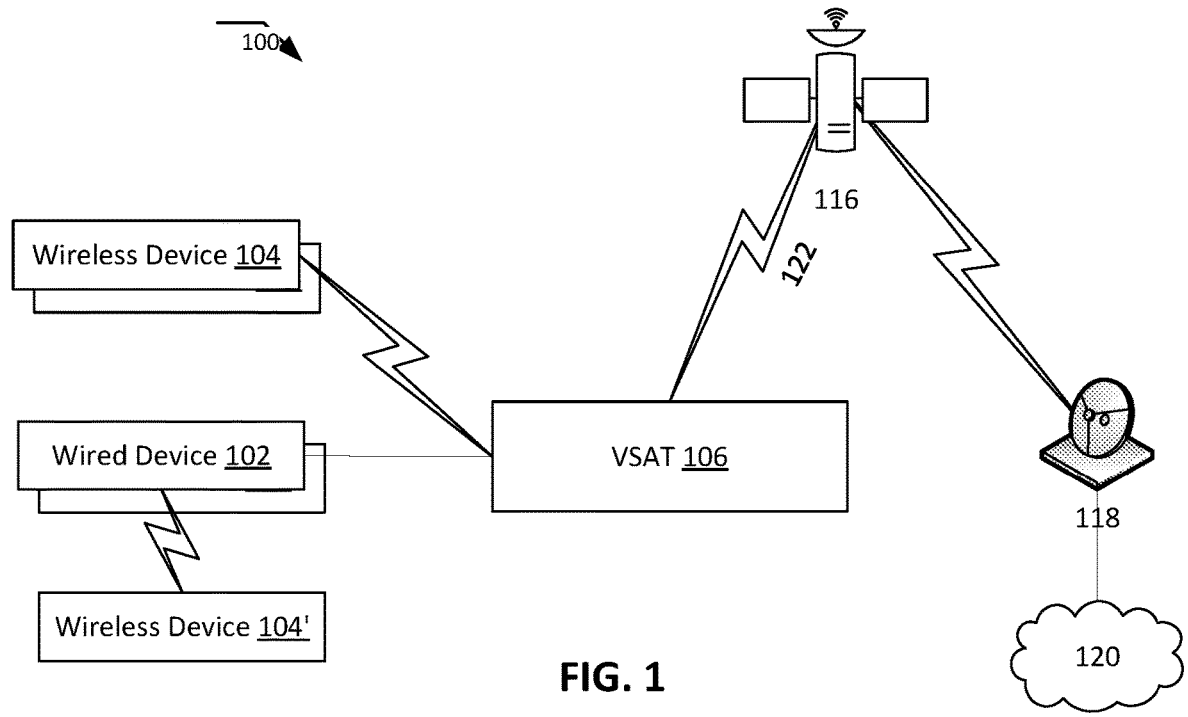
FIG. 1 illustrates an exemplary shared bandwidth network system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced items. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

The present teachings allocate fair satellite bandwidth between wired and wireless devices or just between wireless devices based on classified traffic derived from device link quality and signal strength/located distance. The system may do latency-based classification/prioritization to service the connection suffering from high latency fairly. Latency sensitive devices connected to the VSAT are given a leg-up even if their device link/signal quality is low. When traffic from weakly linked devices competes with traffic from strongly linked wireless devices or ethernet connected devices, they are given a leg-up over devices placed in a higher or same priority.

MAC/Device Flow Control Based on Device Quality:

FIG. 1 illustrates a system to perform device flow control based on device signal quality according to various embodiments.

Figure 1A:
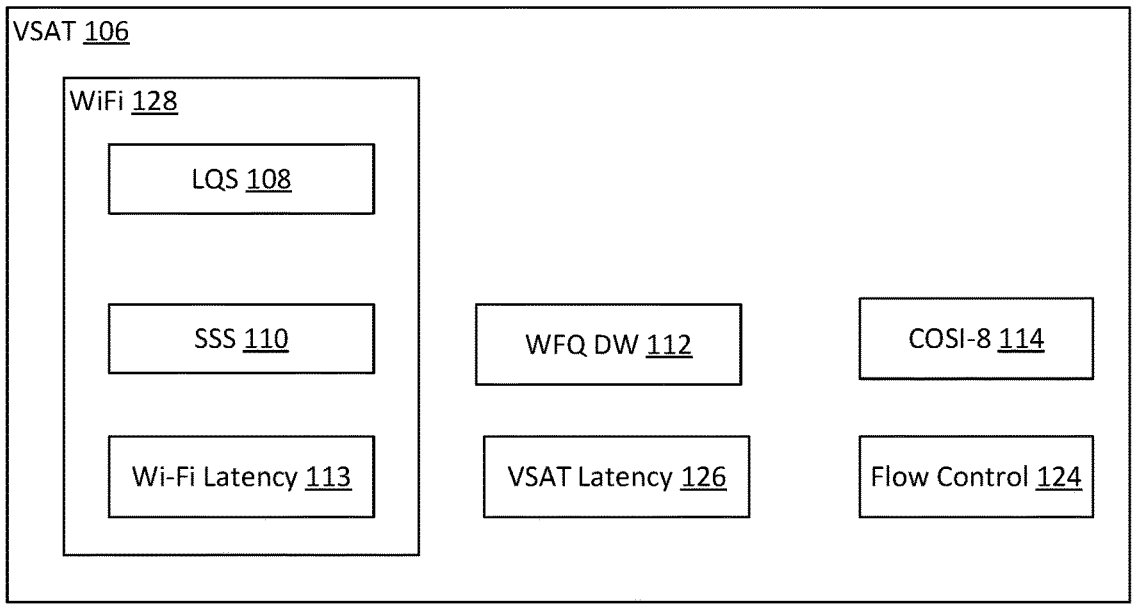
FIG. 1A illustrates an exemplary VSAT for use in shared bandwidth network system.

FIG. 1A illustrates an exemplary VSAT for use in shared bandwidth network system.

In some embodiments, a system 100 may include local devices connected to a VSAT 106 in order to obtain services from a remote device 118 via a shared path 122. The local devices may include wired devices 102, wireless devices 104, and indirect wireless devices 104'. The remote device 118 may include a satellite gateway connected to via a satellite 116. The remote device 118 may connect to an external network 120, such as the internet. In one embodiment, the system 100 may provide internet services thru the remote device 118 to the local devices. The shared path 122 may include an uplink and a downlink to the satellite 116 which connect the VSAT 106 with the remote device 118 (satellite gateway). The wireless devices 104 may directly connect with the VSAT using a wireless protocol such as Wi-Fi. The indirect wireless devices 104' may connect to the VSAT 106 via one of the wired devices 102 that may be an access point, a gateway, a router or the like. A flow control block 124 may use the output of various blocks in the VSAT 106 to queue traffic to and from the remote device 118.

The VSAT 106 may include a Wi-Fi block 128. All traffic from the wired devices 102 and the wireless devices 104 may be managed by the Wi-Fi block 128. The Wi-Fi block 128 may communicate with some of the blocks in the VSAT 106 via ethernet. The Wi-Fi block 128 may collect and/or calculate a device signal quality for the wireless devices 104. The Wi-Fi block 128 may collect and/or calculate a device signal quality for the wired devices 102. An overall link quality and signal strength may be calculated for the wireless devices 104. The data collection may be based on probing each of the wireless devices. In some embodiments, the VSAT 106 may calculate weights to do Weighted Fair Queueing (WFQ) prioritizing of low signal or link quality devices after classification. Periodically, for all connected wireless devices 104, the calculations and subsequent classification of the wireless devices 104 may be repeated. Both wireless devices 104 and wired devices 102 may be identified by their MAC addresses. In one embodiment, the calculations may compute a weight or a score. The score for the wired devices 102 may have a maximum score by default. In some embodiments, scores for the wired devices 102 may not be calculated.

Link Quality Score (LQS) for a Given Device (LSi):

The VSAT 106 may include a LQS block 108. The LQS block 108 may be included in the Wi-Fi block 128 in some embodiments. The LQS block 108 monitors and captures a packet completion of a successful packet transmission, for example, a successful packet transmission over a Wi-Fi link. Based on this the errors in the incoming modulation of successfully received packets may be calculated (for example, based on a symbol error rate and CRC error checking) and given a link quality index.

The LQS for LAN connected devices depends on packets loss at an ethernet driver or a device driver. The device driver may, for example, be included in an Operating System such as Linux.

In one embodiment, a link quality for all the connections for a given device is aggregated and scaled to a value between 0 and 100 with zero being poor and 100 being good quality. An exponential moving average may be applied on the scaled value to compute the average link quality score for a given device. For example, using α as a smoothing factor for a link quality score, the average link quality may be calculated as:

Avg Link Quality ($ALi$)=α*Current Link Quality+
(100−α)*Last Average Link Quality.

Signal Strength Score (SSS) for a Given Device ($SSSi$):

The VSAT 106 may include a SSS block 110. The SSS block 110 may collect the Received Side Signal Strength (RSSI) (dBm) to ascertain the distance at which the sending client device is located for each of the wireless devices 104. The SSS block 110 may probe a respective device for RSSI and per connection packet loss. In some embodiments, this value is available from the RX descriptor of a received data packet.

In some embodiments, the SSS for LAN connected device may be assigned a maximum score for computational purposes to derive overall Device Quality for LAN connected devices.

The SSS block 110 may calculate an Approximate Distance to one of the wireless devices 104. The approximate distance may be calculated as:

$10^{((Measured Transmitted Power-RSSI)(10*N))}$, where the Measured Transmitted Power is the RSSI at 1 meter and N is from 2 to 4 based on environmental factor. This value may be scaled to a value between 0 and 100 with zero being poor signal quality/environment or highest distance and 100 being good quality/environment or shortest distance. An exponential moving average may be applied on the scaled value to compute an average signal strength score or distance score for a given device with β set to be a smoothing factor for signal strength score as:

Avg Signal Strength ($ASi$)=β*Current Signal
Strength+(100−β)*Current Average Signal
Strength.

Higher the Quality Lower the Device Weight (DW).

The VSAT 106 may include a WFQ DW block 112. A Device Quality ($DQ_i$) for a given device may be calculated as the sum of both link quality score ($AL'i$) and signal strength score ($ASi$). The WFQ DW block 112 may dynamically calculate weights to be used for WFQ prioritizing of low signal or link quality devices after classification. The Device Quality (DQi) may classify the behavior of a connected device as it includes the distance of the located device through the measurement of signal strength and error rate. Based on the Device Quality (DQi), Device Quality Weights (DWi) for a given MAC/device may be calculated as: $DW_i=100-[(100*DQ_i)/\Sigma_1^N DQ_i]$, where i is an index for a given device and N is the total number of devices. Based on DWi, traffic originating from device i may be categorized in to 4 categories.

| Device Quality Weight | Classification |
|---|---|
| (DW1 = 75 to 100) | Poor Quality |
| (DW2 = 50 to 75) | Moderate Quality |
| (DW3 = 25 to 50) | Good Quality |
| (DW4 = 0 to 25) | High Quality |

In one embodiment, all incoming LAN packets (wired and wireless) may be classified to their existing traffic classifier Class of Service (COS) between 1 through 8 and then the corresponding satellite transmission traffic class priority (Conversational or Interactive or Streaming or Bulk) by a COS block 114. For a given COS and L2 priority mapping, the packets may be classified/marked based on MAC/device address's quality $DW_i$. So, for all the flows in the same L2 priority, the packets may be drained from the highest to lowest DWi value giving a leg up for wireless devices 104 having latency sensitive flows/traffic connected to the VSAT 106. The leg up will not be provided for the indirect wireless devices 104' as they do not directly connect to the VSAT 106, but connect to the VSAT 106 via one of the wired devices 102, for example, a router.

Latency Based Re-Classification:

The VSAT 106 may include a Wi-Fi latency block 113 to dynamically calculate a total latency experienced prior to sending a packet to the remote device 118 via the satellite 116. In some embodiments, the Wi-Fi latency block 113 may be included in the Wi-Fi block 128. The calculated latency may be for a given packet from each of the wireless devices 104. The Wi-Fi latency block 113 may calculate a total latency experienced by a given packet from each of the wired devices 102, for example, for indirect wireless devices 104'. The metrics may be calculated periodically.

In one embodiment, the Wi-Fi latency block 113 may monitor and capture the latency of a given packet/flow due to wireless hardware/block and a device driver's stack queues. The device driver may be included in an Operating System such as Linux. For wired packets the ($WL_f$) latency due to wireless hardware may be maximized, for example, as a zero (0); wired packets may incur latency by packet flows via device driver queues. An average Wireless Module Latency for a given flow f ($AWL_f$) may be calculated as:

θ*Current Wi-Fi Module Latency+(100−θ)*Current
Average Module Wi-Fi Latency.

In some embodiments, the latency may be calculated for the same packet/flow inside the VSAT 106 by having the start timestamp of the packet as a reference ($VL_f$). An average VSAT Latency for a given flow f ($AVL_f$) may be calculated as: €*Current VSAT Latency+(100−€)*Current Average VSAT Latency. As such, the total latency for a given flow f ($TL_f$) may be calculated as $AWL_f+AVL_f$.

The VSAT latency ratio $VLR_f$ may be calculated as $AVL_f / TL_f$.

The WI-FI latency ratio $WLR_f$ may be calculated as $AWL_f / TL_f$.

Latency-based re-classification may be performed. For example, when latency sensitive Wi-Fi traffic is placed along with the wired traffic and for a given wireless traffic flow f, if (VLRf) is greater than the configurable threshold γ, the wireless traffic may be switched to a higher priority. In some embodiments, when the link/device quality is good (no CRC errors and good signal strength) and when transport over the shared path is also good, and latency increases because of wired traffic with good device quality filling the queues (say in interactive), then priority switching can be performed. For example, if wireless traffic experiences latency at VSAT queues when classified as a stream, it may be dynamically moved or reclassified as interactive so packets can be drained at the same rate or better than the wired traffic with good device quality When the latency sensitive Wi-Fi traffic flow f is already in the highest COS and highest L2 priority along with other traffic, then AVLf of the latency sensitive traffic increases. Packets for traffic f are marked latency sensitive and within the same priority these packets are drained first if the latency exceeds the threshold. This is for latency sensitive application traffic, for example, IoT (Internet of Things) kind of applications traffic; which will be placed at high priority. Conversation priority traffic like Non-SIP/SIP or multicast streaming happening may be drained before that. If multiple flows want to use SCMA expedited bandwidth, for example, BW expedited with SCMA (Scrambled Code Multiple Access), the expediated marked latency sensitive traffic will be drained first.

When the WLRf is greater than the configurable threshold a, other non-latency sensitive Wi-Fi traffic may be switched to a lower priority to share the same priority as flow f. This implies that the latency is caused due to wireless block queues. In some embodiments, the Wi-Fi latency block 113 may switch priorities among wireless traffic. For example, when the link/device quality is good (no CRC errors and good signal strength) and transport is also good, but if latency AWLf increases for a configured latency sensitive (for example, an IoT application) flow and if it shares the same queue or priority with other traffic for the wireless devices 104 (implying the bottleneck is at a wireless block), the Wi-Fi latency block 113 may change/lower the priority non-latency sensitive traffic at the Wi-Fi block 128. The Wi-Fi latency block 113 may calculate latency for both the wired devices 102 and the wireless devices 104. The Wi-Fi latency block 113 may calculate latency for wired and wireless hardware queues. The Wi-Fi latency block 113 may calculate latency for operating system and device driver queues.

The VSAT 106 may include a VSAT latency block 126. The VSAT latency block 126 may calculate latency for all VSAT traffic, for example, wired and wireless. Based on an associated latency, the VSAT latency block 126 may change a device weight used by the WFQ DW block 112.

Figure 2:
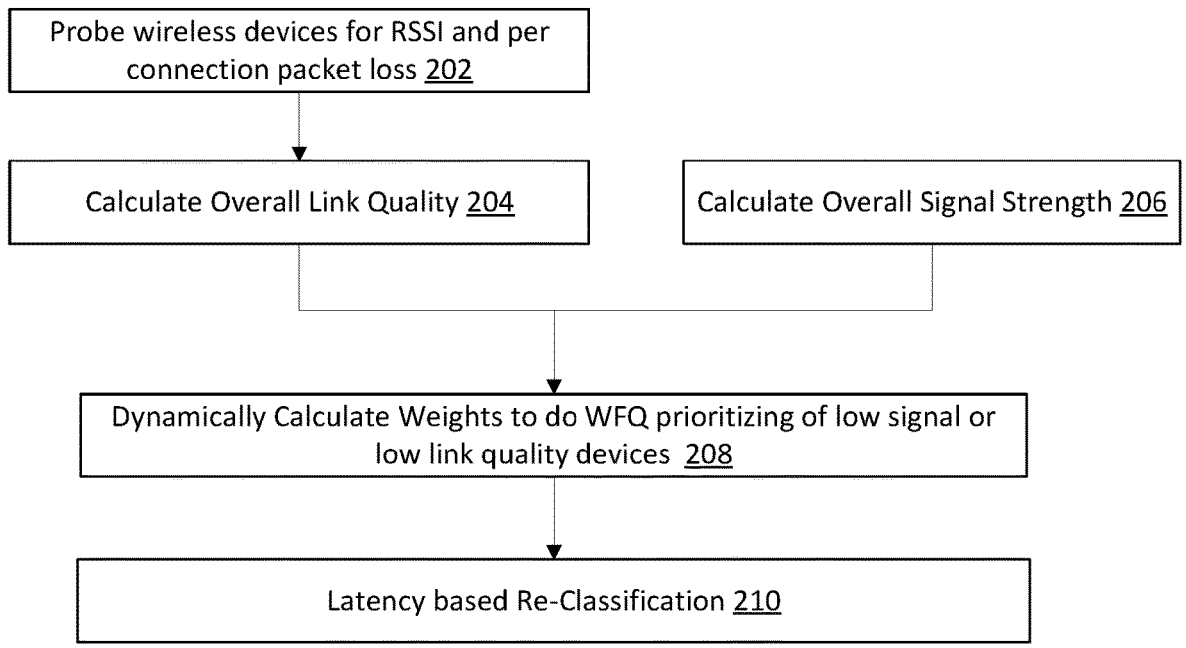
FIG. 2 illustrates an exemplary method for dynamic flow control for latency sensitive Wi-Fi traffic.

FIG. 2 illustrates an exemplary method for dynamic flow control for latency sensitive Wi-Fi traffic.

A method 200 for dynamic flow control for latency sensitive Wi-Fi traffic may include an operation 202 to probe wireless devices for RSSI and per connection packet loss. The method 200 may include an operation 204 to calculate an overall link quality. The method 200 may include an operation 206 to calculate an overall signal strength. The method 200 may include an operation 208 to Dynamically Calculate Weights to do WFQ prioritizing of low signal or low link quality devices. The method 200 may include an operation 210 to Latency based Re-Classification.

Although the subject matter has been described in language specific to structural features and/or methodological acts, it is to be understood that the subject matter in the appended claims is not necessarily limited to the Wi-Fi specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

We claim as our invention:

1. A method for providing a dynamic flow control for latency sensitive Wi-Fi traffic, the method comprising:
   determining a path is congested, wherein the path is shared by local devices to connect to a remote device, wherein the local devices comprise one or more wireless devices or one or more wired devices;
   calculating, for each of the one or more wireless devices, a weight based on a respective link quality and a respective signal strength; and
   prioritizing traffic, between the local devices and the remote device via the path, by increasing a priority of traffic associated with the local devices based on a link quality less than a quality threshold or a signal strength less than a signal strength threshold.

2. The method of claim 1, wherein the calculating is based on a respective Received Side Signal Strength (RSSI) and a respective per connection packet loss.

3. The method of claim 1, wherein the calculating, for each of the one or more wired devices, sets the link quality to a maximum and the signal strength to a maximum prior to determining a respective weight.

4. The method of claim 1, wherein the calculating calculates a link quality score using an exponential moving average of the respective link quality for the one or more wireless devices.

5. The method of claim 1, wherein the calculating calculates a signal strength score using an exponential moving average of the respective signal strength for the one or more wireless devices.

6. The method of claim 1, wherein the prioritizing drains traffic for each Class of Service (COS) and priority mapping based on a respective weight of a respective local device.

7. The method of claim 1, further comprising calculating a total latency experienced prior to sending a packet via the path; and reclassifying the packet when the total latency exceeds a latency threshold.

8. The method of claim 7, wherein the packet belongs to a latency sensitive flow and the reclassifying reclassifies to a higher class of service.

9. The method of claim 7, wherein the packet originates from a wireless device and the reclassifying queues the packet at a higher priority.

10. A device to provide a dynamic flow control for latency sensitive Wi-Fi traffic, the device comprising:
    a flow control block to determine a path is congested, wherein the path is shared by local devices to connect to a remote device, wherein the local devices comprise one or more wireless devices or one or more wired devices;
    a Signal Strength Score (SSS) block to calculate, for each of the one or more wireless devices, a weight based on a respective link quality and a respective signal strength; and
    a Weighted Fair Queueing (WFQ) Device Weight (DW) block to prioritize traffic, between the local devices and the remote device via the path, by increasing a priority of traffic associated with the local devices based on a link quality less than a quality threshold or a signal strength less than a signal strength threshold,
    wherein the WFQ DW block queues traffic to and from each of the one or more wireless devices based on a respective calculated weight from the SSS block.

11. The device of claim 10, wherein the SSS block calculates based on a respective Received Side Signal Strength (RSSI) and a respective per connection packet loss.

12. The device of claim 10, wherein the SSS block calculates, for each of the one or more wired devices, sets the link quality to a maximum and the signal strength to a maximum prior to determining a respective weight.

13. The device of claim 10, wherein the SSS block calculates a link quality score using an exponential moving average of the respective link quality for the one or more wireless devices.

14. The device of claim 10, wherein the SSS block calculates a signal strength score using an exponential moving average of the respective signal strength for the one or more wireless devices.

15. The device of claim 10, wherein the WFQ DW block drains traffic for each Class of Service (COS) and priority mapping based on a respective weight of a respective local device.

16. The device of claim 10, further comprising a Wi-Fi latency block to calculate a total latency experienced prior to sending a packet via the path; and a COSI-8 block to reclassify the packet when the total latency exceeds a latency threshold.

17. The device of claim 16, wherein the packet belongs to a latency sensitive flow and the COSI-8 block reclassifies to a higher class of service.

18. The device of claim 16, wherein the packet originates from a wireless device and the COSI-8 block queues the packet at a higher priority.

19. The device of claim 10, wherein one of the local devices is connected via a lower quality link along the path, and the flow control block throttles the one of the local devices during congestion using the WFQ DW block.

* * * * *